United States Patent [19]
Link et al.

[11] Patent Number: 4,871,050
[45] Date of Patent: Oct. 3, 1989

[54] CLUTCH ARRANGEMENT

[75] Inventors: Achim Link, Schweinfurt; Reinhold Weidinger, Unterspiesheim, both of Fed. Rep. of Germany

[73] Assignee: Fichtel & Sachs AG, Schweinfurt, Fed. Rep. of Germany

[21] Appl. No.: 125,538

[22] Filed: Nov. 25, 1987

[30] Foreign Application Priority Data

Dec. 17, 1986 [DE] Fed. Rep. of Germany ....... 3643072

[51] Int. Cl.$^4$ ...................... F16D 13/50; F16D 23/14
[52] U.S. Cl. .................................. 192/70.29; 192/98; 192/99 A; 192/109 R
[58] Field of Search ................. 192/70.27, 70.29, 70.3, 192/98, 99 A, 109 R

[56] References Cited

U.S. PATENT DOCUMENTS

| | | | |
|---|---|---|---|
| 1,339,801 | 5/1920 | White | 192/98 X |
| 1,520,314 | 12/1924 | Stahl | 192/70.29 |
| 1,828,423 | 10/1931 | Loeffler | 192/70.27 X |
| 1,985,301 | 12/1934 | Thelander et al. | 192/70.3 X |
| 2,009,507 | 7/1935 | Matthews | 192/70.27 X |
| 2,010,181 | 8/1935 | Fink | 192/70.27 X |
| 2,217,078 | 10/1940 | Reed | 192/99 A |
| 2,219,114 | 10/1940 | Reed | 192/70.29 |
| 2,311,997 | 2/1943 | Pearson | 192/70.27 X |
| 2,366,643 | 1/1945 | Nutt | 192/99 A X |
| 2,402,527 | 6/1946 | Baird et al. | 192/70.29 X |
| 2,541,611 | 2/1951 | Reed | 192/70.29 X |
| 3,179,217 | 4/1965 | Root | 192/98 X |
| 3,486,598 | 12/1969 | Wells | 192/98 |
| 4,429,776 | 2/1984 | Maucher et al. | 192/99 A |
| 4,445,600 | 5/1984 | Schmidt | 192/98 X |
| 4,660,701 | 4/1987 | Lassiaz et al. | 192/98 |
| 4,702,362 | 10/1987 | Banks et al. | 192/98 |

FOREIGN PATENT DOCUMENTS 1250948 10/1971 United Kingdom ............... 192/70.3

*Primary Examiner*—Leslie A. Braun
*Assistant Examiner*—Richard M. Lorence
*Attorney, Agent, or Firm*—Toren, McGeady & Associates

[57] ABSTRACT

In a pulled-type clutch arrangement, for the release of the clutch, release levers are provided which are connected in their radially outer region with the clutch cover and in a radially middle region articulatedly with the thrust plate. On the abutment face facing the drive plate, in the region of the radially inner ends, the release levers lie against a release ring which is connectable with a traction force transmission part of a clutch release device. In some cases the clutch arrangement avoids the diaphragm springs usually used in pulled-type clutch arrangements, and nonetheless can be operated as pulled-type clutch. The main spring can be formed by a dished spring which is simpler in construction than a diaphragm spring and avoids disadvantages which arise with diaphragm springs for some purposes, especially in heavy-duty clutches. The dished springs can here be supported in a radially outer region on the clutch cover and can act in a radially inner region upon the thrust plate.

14 Claims, 4 Drawing Sheets

CLUTCH ARRANGEMENT

BACKGROUND OF THE INVENTION

The invention relates to a clutch arrangement, especially for motor vehicles, comprising a clutch cover having a clutch cover axis, intended for attachment to a drive plate, a thrust plate mounted non-rotatably but movably on this clutch cover for pressing a clutch plate against the drive plate, a main spring system acting upon the thrust plate and supported on the clutch cover, a plurality of release levers arranged in distribution at angle intervals about the axis of the clutch cover, which are articulatedly in engagement, with articulation axes placed in each case tangentially—in relation to the axis of the clutch cover, at radially mutually staggered points with the clutch cover and with the thrust plate and are formed at their radially inner ends for engagement with a release part of a release bearing.

STATEMENT OF THE PRIOR ART

Such clutch arrangements are known. Ordinarily such clutch arrangements with release levers are formed as pressed-type clutches in which a release part of an axially movable release bearing acts upon the radially inner ends of the release levers with direction towards the drive plate, so that the radially inner ends of the release levers are brought closer in the direction towards the drive plate in clutch disengagement.

On the other hand it is widely known to construct what are called pulled-type diaphragm spring clutches in which no release levers are present. In their case the diaphragm springs are supported on the clutch cover and act upon the thrust plate. The release part of the release bearing then engages with a release ring which is carried by the radially inner ends of the spring tongues of the diaphragm spring. Since the pulled-type diaphragm spring clutches have become very widespread, release bearings for such pulled-type diaphragm spring clutches are available in many forms and with high technical standards.

In heavy-duty clutches the diaphragm spring form of embodiment is not always desired, so that recourse is made to the clutch type with release levers as mentioned at the outset.

OBJECT OF THE INVENTION

The invention is based upon the problem of developing clutch arrangements of the initially designated kind so that they can likewise be operated as pulled-type clutches.

SUMMARY OF THE INVENTION

To solve this problem it is proposed in accordance with the invention that the release levers are mounted in a radially outer region on the clutch cover, that the release levers in a radially middle region are articulatedly connected with the thrust plate and that a release ring, which is connectable with a traction force transmission part of a clutch release device, rests on abutment faces, facing the drive plate, in the region of the radially inner ends of the release levers.

As already stated, the clutch arrangement in accordance with the invention avoids diaphragm springs which are undesired in some cases, and nonetheless can be operated as a pulled-type clutch. This is for the one part desired with regard to the existing release devices for pulled-type clutches, and in some installation cases it is necessary for reasons of space.

The main spring can be formed by a dished spring, which is still simpler in construction than a diaphragm spring and avoids disadvantages which occur with diaphragm springs for some purposes, especially in heavy-duty clutches. The dished springs can here be supported in a radially outer region on the clutch cover and can act in a radially inner region on the thrust plate.

An especially simple and favourably priced configuration is obtained in that the release levers comprise, in the region of their radially outer ends, support bearing faces which are directed towards the drive plate and are articulatedly supported on counter-bearing faces of the clutch cover.

For the adjustment and if necessary readjustment of the clutch it is advantageous if the counter-bearing faces are formed on setting bolts which are arranged adjustably and securably in the clutch cover. These setting bolts can be received adjustably by screwing in the clutch cover, can comprise a bolt head with the respective counter-bearing face at their end remote from the drive plate, and can carry a lock nut in the region of their other end.

The release levers can be made in a manner known per se with joint eyes and mounted with these joint eyes on joint bolts which are arranged tangentially—in relation to the axis of the clutch cover—on the thrust plate. The retention of the release ring on the release levers can be produced in a simple manner in that the release ring is held by a secondary spring system in the position of engagement with the abutment faces of the release levers. This secondary spring system can be supported in a simple manner on the thrust plate. By way of example the secondary spring system can be formed by substantially radially extending secondary spring elements supported on the thrust plate, which rest with their radially inner ends on the release ring.

In such a pulled-type clutch arrangement the secondary spring system acts against the primary spring system. While in fact the primary spring system acts upon the thrust plate in such a direction that it moves the thrust plate in the direction towards the drive plate and thus clamps the clutch disc in frictional engagement between the thrust plate and the drive plate, the secondary spring system has the tendency to lift the thrust plate, by means of the release levers, away from the drive plate. Since however now the pressing of the thrust plate against the clutch disc and—through the clutch disc—against the drive plate is absolutely necessary for the frictional engagement of the clutch, the secondary spring system must be made as weak as possible in its effect compared with the effect of the primary spring system, so that the action issuing from the primary spring system upon the thrust plate and thus—through the clutch disc—upon the drive plate is weakened as little as possible. For the normal operational condition it is quite sufficient if a weak secondary spring system is provided, since this secondary spring system is intended only to hold the release ring in constant engagement with the radially inner abutment faces of the release levers, for which purpose a slight spring force of the secondary spring system is quite sufficient.

Now however, in pulled-type clutches of the style of construction under consideration here, it is often desired to make a traction force transmission part of a clutch release device, intended for releasing the clutch, capable of connection with the release ring by a snap connection which can be produced by pushing of the traction force transmission part on to the release ring. If now this traction force transmission part is pushed on to the release ring in the installation of the clutch for example into the drive mechanism of a motor vehicle, a not inconsiderable force is necessary to cause the snap connection to snap in. This force too is taken up by the secondary spring system. If now the secondary spring system delivers only a slight spring force, which is desired in order not to weaken the spring force of the primary spring system, this can have the consequence of the release ring, in the pushing on of the force transmission part of the clutch release device, yielding in the direction towards the drive plate, with deformation of the secondary spring system. This renders difficult the production of the snap connection, and can have the consequence that the centering of the release ring in relation to the release levers is lost.

In a further advantageous development of the invention it is therefore proposed that the release ring, in the preassembled condition of the clutch, before and in the production of the snap connection between the force transmission part and the release ring, is supported on the thrust plate by an auxiliary support system which prevents deflection of the release ring in the direction of the drive plate in the production of the snap connection, and that this auxiliary support system is settable out of effect at the latest in the first clutch disengagement action.

The auxiliary support system is readily in a position to take up the forces acting upon the release ring in the production of the snap connection and thus to prevent the release ring from yielding back in the direction towards the drive plate. For the other part however this auxiliary support system must not be operative in normal working, because when the clutch disc is worn the thrust plate shifts in the direction towards the drive plate and this shift and the corresponding shift movements of the radially inner ends of the release levers would be hindered by the auxiliary support system. For this reason it is essential that the auxiliary support system is set out of operation at the latest in the first clutch disengagement. Naturally at this time the clutch disc is not yet worn. However the auxiliary support system must be made ineffective as early as in the first clutch disengagement so that it is ineffective at the time when wear to the clutch plate occurs and the shifting movement of the thrust plate and the release levers which then occurs is not thereby hindered.

According to a preferred form of embodiment it is provided that the auxiliary support system can be set out of operation by the release movement of the release ring, directed away from the drive plate, in the first clutch disengagement. This measure ensures that no special working action becomes necessary in order to make the auxiliary support system ineffective. This is desired not only because such a special working action incurs costs and can be forgotten. More especially it is also to be taken into consideration that after the installation of the clutch and the release device, access to the auxiliary support system is very difficult, if not completely impossible. For this reason it is especially desired that the setting out of effect of the support system is coupled originally with a necessarily occurring action, that is especially with the release of the release ring in the first clutch disengagement.

In a first form of embodiment of the auxiliary support system the secondary spring system contributes to the formation of the auxiliary support system: the secondary spring system comprises secondary spring elements which extend substantially radially and rest with their radially inner ends on the release ring; support elements are fitted on the thrust plate each in the vicinity of one of the secondary spring elements; a substantially axially directed support face, facing away from the drive plate, is provided for the respective secondary spring element on such a support element; a deflector dog is provided on the support element adjacent to a defining edge thereof, which dog—starting from the support face—extends away from the drive plate; the secondary spring element, in the preassembled condition, is held by the deflector dog in a peripherally deflected position—in relation to the clutch cover axis—and lies against the support face; the height of the deflector dog is dimensioned so that in the release of the release ring effected by the first clutch disengagement the secondary spring element lifts away from the support face and springs over the deflector dog into a non-deflected position in which it is movable in axial direction past the support element.

In the case of this form of embodiment thus apart from the secondary spring elements, which are necessary in any case, only a number of support elements with formed-on support faces and deflector dogs is necessary, which can be formed on by casting or forgeing in the production of the thrust plate.

In this first form of embodiment of the auxiliary support system the secondary spring element can be formed by a stirrup piece, closed in U-form, of a leg spring anchored on the thrust plate, while the deflector dog engages behind one of the U-legs in the deflected-out position.

According to another form of embodiment, which permits any desired developments of the secondary spring system, it is provided that on the thrust plate there are fitted auxiliary support springs which, in the pre-assembled condition before the production of the snap connection, are supported with an outwardly deflectable spring end on the thrust plate and engage with a release ring; in this case these initally deflected-out spring ends become free and come out of the region of movement of the release ring by relaxation, in the release of the release ring effected by the first clutch disengagement.

If the spring ends are movable in planes containing the axis of the clutch cover, they can rest on the release ring without special abutment points on the release ring being necessary. If according to a further form of embodiment the spring ends are movable in a plane perpendicular to the axis of the clutch cover, in their deflected-out position they must be held in engagement with the release ring by a shoulder of the latter.

BRIEF DESCRIPTION OF THE DRAWINGS

The invention is explained by reference to examples of embodiment by the accompanying Figures, wherein.

DESCRIPTION OF PREFERRED EMBODIMENTS

Figure 1:
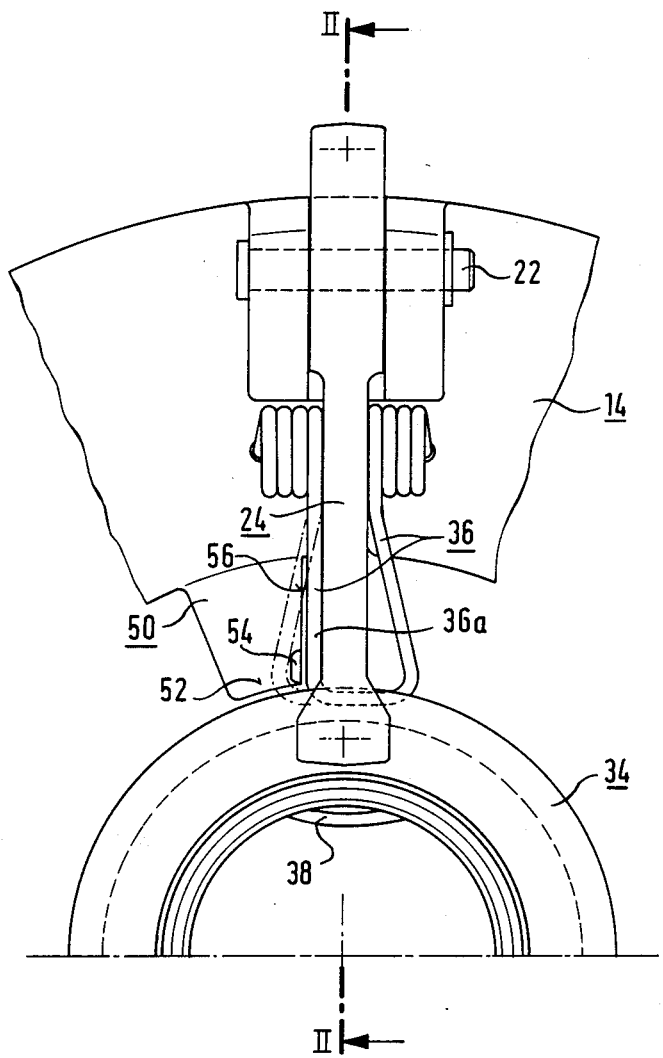
FIG. 1 shows a partial view of a clutch arrangement according to the invention, seen in the axial direction of the clutch cover.
Figure 2:
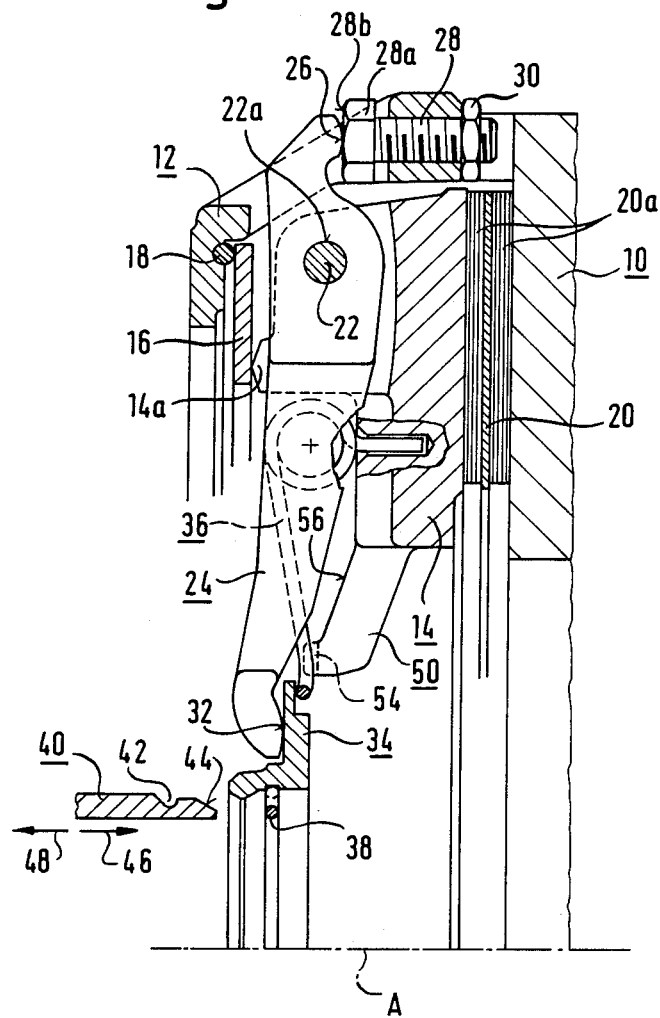
FIG. 2 shows a section along the line II—II in FIG. 1.

In FIGS. 1 and 2 a drive plate is designated by 10. A clutch cover 12, the axis of which is designated by A, is secured to this drive plate 10 by securing means which are not shown. Within the clutch cover 12 there is secured a thrust plate 14 which is concentric with the clutch cover 12 and is non-rotatable in relation to the clutch cover 12 but axially displaceable. A dished spring 16 is supported by means of a wire ring 18 on the clutch cover 12 and rests with its radially inner region against an annular projection 14a of the thrust plate 14. This dished spring 16 presses the thrust plate 14 in the direction towards the drive plate 10, so that a clutch plate 20 arranged between the drive plate 10 and the thrust plate 14 is in frictional engagement with the drive plate 10 and the thrust plate 14. The clutch plate 20 is arranged in conventional manner with a clutch plate hub (not shown) on a drive-output shaft which is conducted to the left in FIG. 2 out of the clutch cover 12 and leads to a gearing. The drive plate 10 is connected with the crank-shaft of an internal combustion engine.

The release levers 24 are mounted in a radially outer region on the clutch cover 12 and articulatedly connected in a radially middle region with the thrust plate 14. In the region of the radially inner ends of the release levers 24 a release ring 34, which is connectable with a traction transmission part 40 of a clutch release device, rests on the abutment face 32 facing the drive plate. This means that the release levers 24 are articulated by joint bolts 22 to the thrust plate 14. In the region of their radially outer ends the release levers 24 comprise support bearing faces 26 directed towards the drive plate, which are articulatedly supported on counter-bearing faces 28b of the clutch cover 12. In the example of embodiment as shown the counter-bearing faces 28b are formed on setting bolts 28 which are arranged displaceably and securably in the clutch cover 12. These setting bolts 28 can be received adjustably by screwing in the clutch cover 12, can comprise at their end remote from the drive plate a bolt head 28a with the counter-bearing face 28b in each case and can carry a lock nut 30 in the region of their other end. The release levers 24 further comprise joint eyes 22a with which they are mounted on joint bolts 22 arranged tangentially in relation to the axis (A) of the clutch cover on the thrust plate 14. The release ring 34 is held in an engagement position with the abutment faces 32 of the release levers 24 and centered in relation to the release levers 24 by a secondary spring system 36, so that it lies concentric with the axis (A) while the secondary spring system 36 is supported on the thrust plate 14. The secondary spring system 36 is formed by secondary spring elements 36 which are supported on the thrust plate 14, extend substantially radially and rest with their radially inner ends on the release ring 34.

A snap spring 38 is mounted on the release ring 34. This snap spring 38 is connected with a traction force transmission part 40 of a release device, for the formation of a snap connection. In the traction force transmission part 40 a ring groove 42 is provided which receives the snap spring 38 when the snap connection is constituted. As may be seen from FIG. 1, the snap spring 38 is corrugated.

An expanding taper 44 is formed on the traction force transmission part 40. For the constitution of a connection between the traction force transmission part 40 and the release ring 34, the transmission part 40 is pushed in the direction of the arrow 45 into the release ring 34 until the snap spring 38 snaps into the ring groove 42. A considerable inward thrust force is necessary for this purpose.

When once the snap connection is constituted between the parts 34 and 40, then the clutch can be disengaged by the movement of the traction force transmission part 40 to the left in the direction of the arrow 48. In this movement the release ring 34 is entrained to the left, the release levers 24 are pivoted in the clockwise direction in FIG. 2 and the thrust plate 14 lifts away from the drive plate 10, so that the clutch plate 20 becomes free.

At this point it should be remarked that the leg springs or secondary spring elements 36 are intended only to hold the release ring 34 in abutment on the abutment faces 32 of the release levers 24.

The leg springs 36 act against the dished spring 16 and should therefore be made with the slightest possible spring force, so that the force of the main spring system 16 acting upon the thrust plate 14 is weakened as little as possible.

This has the consequence that in the pushing of the traction force transmission part 40 on to the release ring 34 for the purpose of constitution of the snap connection between the snap spring 38 and the ring groove 42, the release ring 34 seeks to move to the right in the direction towards the drive plate 10. This is undesired because thus the constitution of the snap connection 38, 42 is rendered difficult and because the danger exists that the centering of the release ring 34 in relation to the release levers 24 may be lost.

Therefore an auxiliary support system is provided which prevents deviation of the release ring 34 to the right in the constitution of the snap connection between the part 34 and 40.

For this purpose support elements 50 illustrated in FIGS. 1 and 2 are fitted on the thrust plate 14. These support elements 50 have a support face 52 and deflector dogs 54. The deflector dogs 54 are adjacent to an edge 56 of the relevant support element 50.

Regarding the formation of the leg springs 36 it is to be added that these are made with U-shaped legs which form a closed U-stirrup. The undeflected position of the leg springs 36 is represented in solid lines in FIG. 1.

In the pre-assembled condition before constitution of the snap connection the U-stirrup of the leg spring 36, as represented in dot-and-dash lines in FIG. 1, is deflected out so far that the one leg of the U-stirrup which is designated by 36a rests on the support face 52 and is held in the deflected-out position by the deflector dog 54. Thus this leg 36a lies between the support face 52 and the release ring 34. In this way, in the constitution of the snap connection between the parts 34 and 40, the release ring 34 is supported against yielding out in the direction towards the drive plate 10. Now the traction force transmission part 40 can be thrust into the release ring 34 until the snap spring engages in the ring groove 42, without the release ring 34 deviating to the right, even if the leg springs 36 can apply only a slight spring force.

However this condition is not permissible in the long term, for the following is to be taken into consideration : when the clutch plate 20 wears away due to wear on the clutch linings 20a, the thrust plate 14 must be able to shift to the right in the direction towards the drive plate 10, and this signifies that the radially inner ends of the release levers 24 must be able to rotate in the counterclockwise direction. This would be prevented by the leg springs 36 as long as these rest on the support faces 52. Now however in the first clutch disengagement the release ring 34 with the traction force transmission part 40 is moved to the left in the direction of the arrow 48. In this movement, thanks to the lever transmission ratio of the release levers 24, the abutment faces 32 lift to the left away from the support elements 50. This means that the leg 36a likewise shifts out to the left in FIG. 2 over the deflector dogs 54 with the consequence that the leg spring 36 then springs back into the undeflected position, which is represented in solid lines in FIG. 1. Now the leg 36a no longer rests on the support face 52. If then wear occur on the friction linings 20a and the radially inner ends of the release levers 24 accordingly shift to the right in FIG. 2, they can do this without hindrance by the leg springs 36, because the leg springs 36 can go with the leg 36a past the edge 56.

Figure 3:
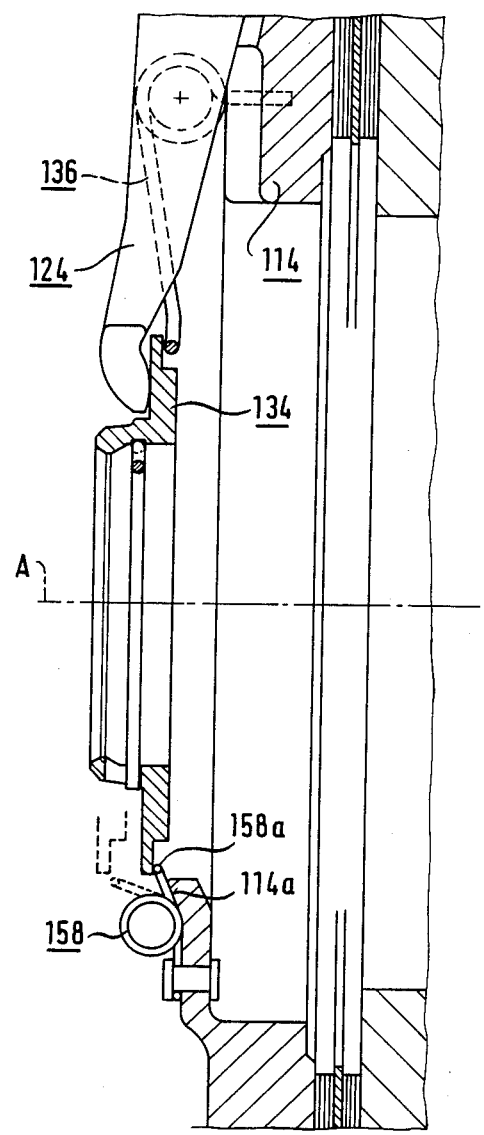
FIG. 3 shows a section corresponding to that of FIG. 2, in a second form of embodiment of the invention.

A further form of embodiment is represented in FIG. 3. This form of embodiment is constructed substantially exactly like the form of embodiment according to FIGS. 1 and 2. In departure from this first-described form of embodiment on the thrust plate 114 there are arranged auxiliary support springs 158, namely spiral springs with an outwardly deflectable spring end 158a, which may be angled off in a tangential direction. In the pre-assembled condition as represented in FIG. 3 the release ring 134 is pressed to the right by the release levers 124 under the action of the dished spring (see dished spring 16 in FIG. 2), which is not illustrated here but is identical with the form of embodiment according to FIGS. 1 and 2, so that the release ring 134 rests on the spring ends 158a and these spring ends 158a are supported on the thrust plate 114 in the region 114a. In this way the release ring 134 is again secured against yielding to the right, so that the snap connection—as described in the form of embodiment according to FIGS. 1 and 2—can be constituted without deviation of the release ring 134 to the right, without consideration of the spring force applied by the leg springs 136. The leg springs 136 can here be formed exactly as in the form of embodiment according to FIG. 1, with the difference only that they are not used for the formation of the auxiliary support system.

When in the form of embodiment according to FIG. 3 after the constitution of the snap connection, in the course of the first clutch disengagement the release ring 134 is first drawn to the left, then the spring end 158a pivots under the action of the spring force within the spiral spring 158 into the position illustrated in solid lines in FIG. 3, so that thenceforth the release ring 134 can freely pass the spring end 158a, especially when wearing of the clutch linings takes place.

Figure 4:
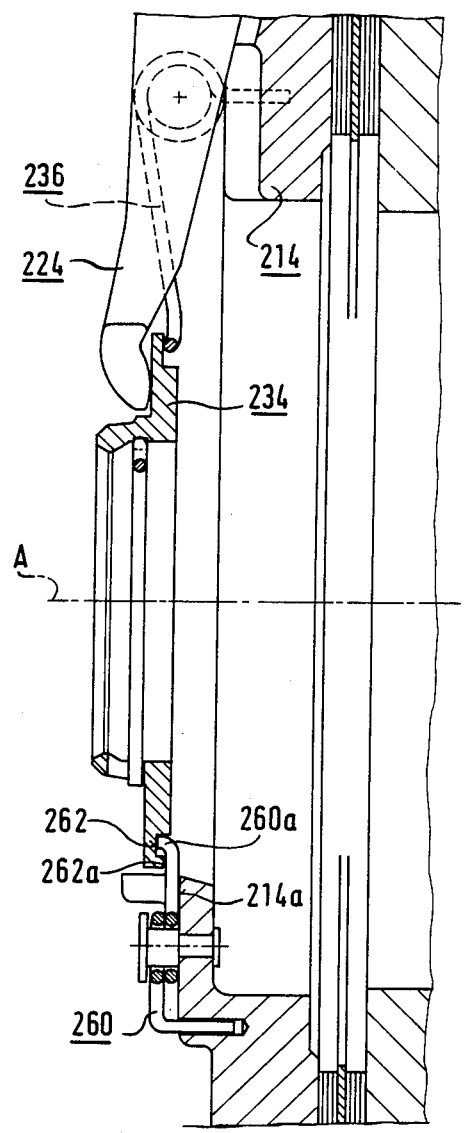
FIG. 4 shows a section corresponding to that of FIGS. 2 and 3, in a third form of embodiment of the invention.

The form of embodiment according to FIG. 4 largely corresponds to that according to FIG. 3 with the difference that the auxiliary support springs 260 are of different formation. Again spiral springs with free spring ends 260a are concerned. The free spring ends 260a are angled off and engage, in the pre-assembled condition before the constitution of the snap connection, in a recess 262 of the release ring 234, so that the free spring end 260a is held against the action of the spring force of the spiral spring in the position as represented in FIG. 4. The spring end 260a is supported by the thrust plate 214 in the support region 214a. Thus again it is ensured that in the thrusting of the traction force transmission part 240 into the release ring 234 for the constitution of the snap connection the release ring 234 cannot deviate to the right. Naturally the basis is again to be adopted that the release ring 234 in this pre-assembled condition is pushed to the right by the release levers 224 under the action of the dished spring (not shown) according to FIGS. 1 and 2 against the action of the leg spring 236, so that the engagement of the spring ends 260a in the recess 262 is secured and the spring end 260a cannot relax, because it is resting on the support shoulder 262a which defines the recess 262.

In the first release action resulting from the first clutch disengagement, the release ring 234 is drawn to the left by means of the traction force transmission part 40 as illustrated in FIG. 2, so that the spring end 260a emerges from the recess 262 and the spring end can be rotated, under the action of the spring force stored in the spiral spring 260, in a plane perpendicular to the clutch axis A, until the spring end 260a lies radially outside the external circumference of the release ring 234. Then without hindrance by the spring end 260a the release ring 234 can pass the spring end in the axial direction, especially when the clutch friction linings wear away and therefore the thrust plate 214 and consequently also the release ring 234 shift to the right.

We claim:
1. A clutch arrangement, especially for motor vehicles, comprising:
   a clutch cover (12) with a clutch cover axis (A),
   a thrust plate (14) mounted non-rotatably but axially movably on said clutch cover (12), for pressing a clutch plate (20) in a first axial direction,
   a primary spring system (16) acting upon the thrust plate in said first axial direction (14) and supported on the clutch cover (12),
   a plurality of release levers (24) arranged in distribution at angular intervals about the axis (A) of the clutch cover (12),
   a radially outer region of the release levers (24) being articulatedly supported on the clutch cover (12),
   a radially middle region of the release levers (24) being articulatedly connected with the thrust plate (14), and
   a radially inner region of the release levers being formed with abutment faces (32) facing in said first axial direction, a release ring resting on said abutment faces, clutch disengagement being obtainable by a pulling action onto said release ring (34) in a second axial direction opposite to said first axial direction through a traction force transmission part (40) of said release bearing, said traction force transmission part (40) being connectable with said release ring (40) by a snap connection (38, 42) under a predetermined axial pressure acting onto said traction force transmission part (40) and against said release ring (34) in said first axial direction, said release ring (34) being urged into engagement with the abutment faces (32) of the release levers (34) by a secondary spring system (36) exerting a spring force onto said release ring (34) in said second axial direction which spring force is insufficient to withstand said predetermined pressure, said release ring (34) being maintained in contact with said abutment faces through an auxiliary support system fitted on the thrust plate (50, 52, 54, 36a) which prevents the release ring (34) from escaping in said first axial direction under said predetermined pressure, said auxiliary support system (50, 52, 54, 36a) being settable out of operation after establishing said snap correction (38, 42) by a first clutch disengage operation at the latest.

2. A clutch arrangement according to claim 1, characterised in that the primary spring system (16) is formed by a dished spring (16).

3. A clutch arrangement according to claim 2, characterised in that the dished spring (16) is supported in a radially outer region on the clutch cover (12) and acts in a radially inner region upon the thrust plate (14).

4. A clutch arrangement according to claim 1, characterised in that the release levers (24) comprise, in the region of their radially outer ends, support bearing faces (26) facing in said first direction which are articulatedly supported on counter-bearing faces (28b) of the clutch cover (12).

5. A clutch arrangement according to claim 4, characterised in that the counter-bearing faces (28b) are formed on setting bolts (28) which are arranged adjustably and securably in the clutch cover (12).

6. A clutch arrangement according to claim 5, characterised in that the setting bolts (28) are threadably received in the clutch cover (12), comprise a bolt head (28a) with the respective counter-bearing face (28b) at their end remote from the drive plate and carry a lock nut (30) in the region of their other end.

7. A clutch arrangement according to claim 1, characterised in that the release levers (24) are made with joint eyes (22a) and are mounted with these joint eyes (22a) on joint bolts (22) which are arranged tangentially, in relation to the axis (A) of the clutch cover, on the thrust plate (14).

8. A clutch arrangement according to claim 1, characterised in that the secondary spring system (36) is supported on the thrust plate (14).

9. A clutch arrangement according to claim 1, characterised in that the secondary spring system (36) is formed by substantially radially extending secondary spring elements (36) supported on the thrust plate (14), which rest with their radially inner ends on the release ring (34).

10. A clutch arrangement according to claim 1, characterised in that the secondary spring system comprises substantially radially extending secondary spring elements (36) which rest with their radially inner ends on the release ring (34), in that said auxiliary support system comprises a support element (5), in that on this support element (50) there is provided a substantially axially directed support face (52), facing in said second axial direction, for the respective secondry spring element (36), in that adjacent to a defining edge (56) of the support element (50) there is provided a deflector dog (54) which, starting from the support face (52), extends in said second axial direction, in that the secondary spring element (36) is held by the deflector dog (54) in a position deflected circumferentially in relation to the axis (A) of the clutch cover (12) and rests on the support face (52), and in that the height of the deflector dog (54) is so dimensioned that upon the first clutch disengagement the secondary spring element (36) lifts away from the support face (52) and springs back over the deflector dog (54) into an undeflected position in which it is movable in the first axial direction past the support element (50).

11. A clutch arrangement according to claim 10, characterised in that a secondary spring element (36) is formed by a stirrup, closed in U-form, of a leg spring anchored on the thrust plate, while the deflector dog (54) engages behind one of the U-legs (36a) in the deflected position.

12. A clutch arrangement according to claim 1, characterised in that said auxiliary support system comprises auxiliary support springs (158) which are supported with a deflectable spring end (158a) on the thrust plate (114) (at 114a) and act upon the release ring (134), and these deflectable spring ends (158a) come by relaxation out of the range of movement of the release ring (134) in the shift of the release ring (134) effected by the first clutch disengagement.

13. A clutch arrangement according to claim 12, characterised in that the spring ends (158a) are movable each in a plane containing the clutch cover axis (A).

14. A clutch arrangement according to claim 12, characterised in that the spring ends (260a) are movable in a plane perpendicular to the clutch cover axis (A) and engage behind a shoulder (262a) of the release ring (234).

* * * * *